Patented Dec. 3, 1935

2,022,811

UNITED STATES PATENT OFFICE 2,022,811

MINERAL WOOL AND MANUFACTURE THEREOF

John E. Morrow, East St. Louis, Ill., and Jesse Bryte Barnitt, Pittsburgh, Pa., assignors to Aluminum Company of America, Pittsburgh, Pa., a corporation of Pennsylvania No Drawing. Application November 19, 1931, Serial No. 576,214

6 Claims. (Cl. 49—77.5)

This invention relates to the production of a mass of minute fibers or wool from the residues obtained in the commercial extraction of alumina from bauxite or other aluminous ores.

In processes of obtaining alumina from bauxite or similar aluminous ores as by alkaline extraction processes such as the well-known Bayer process, the ore is usually treated with an alkali, or a mixture of an alkali carbonate and lime which dissolves from the ore the major portion of its alumina content, leaving an insoluble residue composed chiefly of the oxides of silicon, aluminum, iron, titanium, calcium, and sodium. This residue has some uses but the bulk of it is merely wasted and thrown away.

An object of the present invention is to develop a new and wider use for these waste residues. A further object of the invention is to provide a method of treating said residues in such a manner and under such conditions that they may be satisfactorily transformed into masses of minute fibers or wool having properties analogous to those of the mineral wools now commercially available. Another object of the invention is to provide a process for the treatment of these residues, which process will produce at its end product a mass of minute fibers or wool of the fine, soft, cotton-like texture so often desired and so seldom obtained in commercial mineral wools.

The residues obtained from the above-mentioned treatments of aluminous ores vary somewhat in composition, depending upon the source of the ore. For instance, the residue from the treatment of a bauxite mined from a deposit near the Demerara River in British Guiana contained about 13 per cent of $SiO_2$, about 33 per cent of $Al_2O_3$, about 6 per cent of $Fe_2O_3$, about 9 per cent of $TiO_2$, about 15 per cent of $CaO$, and about 3.5 per cent of $Na_2O$, the balance being, chiefly, water and carbon dioxide which were lost on ignition. The residue resulting from the treatment of a bauxite from a deposit near the Surinam River in Dutch Guiana contained about 11.4 per cent of $SiO_2$, about 19.5 per cent of $Al_2O_3$, about 25.2 per cent of $Fe_2O_3$, about 12.8 per cent of $TiO_2$, about 6.5 per cent of $CaO$, and about 7 per cent of $Na_2O$, the balance being water and carbon dioxide which were lost on ignition. The residue resulting from the treatment of a bauxite obtained from Arkansas contained about 12.5 per cent of $SiO_2$, about 24.5 per cent of $Al_2O_3$, about 8 per cent of $Fe_2O_3$, about 5.5 per cent of $TiO_2$, about 19 per cent of $CaO$, and about 7 per cent of $Na_2O$, the balance being water and carbon dioxide which were lost on ignition. The residues resulting from the treatment of these and other bauxites, while varying somewhat in particular composition, possess the same general characteristics in that they contain the same constituents and come from a related source as the result of the same or similar treatment. Quite often, the bauxites are mixed with each other prior to the process of dissolving the alumina from the ore, or residues are mixed after dissolving alumina from different ores, with the result that residues of intermediate compositions are obtained.

We have discovered that such residues, although they are composed in great part of oxides of high melting point and are substantially different in composition from the "slags" from which mineral wools are usually produced, may be melted and, by means of the accepted commercial processes, blown into a mass of minute fibers or wool which may be put to the same or to similar uses as the mineral wools heretofore produced from entirely dissimilar raw materials.

We have found, moreover, that the mass of minute fibers or wool obtained from such residues may vary considerably in its characteristics and that the amount of wool obtained from a given amount of residue may vary to a considerable extent, according to the residue or the mixture of residues used. While our discovery that a waste product of this nature containing high melting oxides in large amounts may be utilized for the production of mineral wools is important, it is of greater importance that a method be obtained by which residues, regardless of specific composition, may be treated to produce a wool of uniform grade or grades.

Working towards this end, we have discovered that if the residue, regardless of its specific composition, be mixed with certain quantities of an alkaline earth metal or an alkali metal-bearing material (hereinafter referred to as aluminate-forming materials), such as lime, limestone, dolomite, sodium oxide, etc., the resulting mixture, when melted and poured in molten form into a blast of air, steam, or other gaseous fluid delivered at a high pressure, will be converted to a large extent to a mass of minute fibers or wool of a grade acceptable for use as a mineral wool. The certain quantity of an aluminate-forming material which is necessarily added to the residue to produce these results is, we have discovered, an amount which will produce a mixture having a content of aluminate-forming material substantially equal to or greater than the amount required to convert into aluminates the alumina content of the mixture. The aluminate-forming material may be one or a mixture of alkaline earth compounds or alkali metal compounds but we prefer to use, because of availability and low cost, such a material as limestone.

When the residues are mixed with the amount of aluminate-forming materials above indicated and melted and blown into a mass of minute fibers or wool in accordance with the usual and long practiced methods of that art, the amount of wool produced represents a substantial proportion of the residue mixture which is melted, and the resulting wool product is of a commercial grade. However, the texture of the wool may vary considerably with the composition of the original residue employed, some of the wools being quite harsh in texture and others being of a soft, cotton-like texture. In attempting to produce wools which would be of the desirable fine, soft, cotton-like texture, regardless of the original residue employed, we have discovered that the texture of the wool produced is, when the residue has been mixed with aluminate-forming materials as above described, to a large extent controlled by the amount of titanium oxide present in the residue. When the titanium oxide content of the residue or the residue-aluminate-forming material mixture is less than about 5 per cent, the texture of the wool produced tends to be harsh whereas, if the content of titanium oxide is above about 5 per cent, the wool tends to the fine, cotton-like texture which marks a high grade mineral wool. Generally it is preferable to keep the titanium oxide content below about 15 per cent. However, so long as the titanium content is above about 5 per cent by weight, a wool of soft, cotton-like texture will be obtained. The titanium oxide content of the starting residue or mixture may be adjusted by adding thereto titanium oxide but we prefer to adjust the composition of residues containing less than 5 per cent of titanium oxide by adding thereto predetermined amounts of other residues which contain sufficient titanium oxide to raise the content of the final mixture to the amount desired. Such residues bearing large amounts of titanium oxide are usually available and furnish an inexpensive source of titanium oxide for this purpose.

The residues, whether adjusted in composition as above described or used in their original form, may be formed into wool according to the general well known practice of the art which consists essentially in heating the starting materials until they form a molten fluid mass, and pouring or otherwise introducing the molten mass into a moving stream of air or other gaseous fluid of sufficient velocity, the action of which is to blow the molten mass through the air and into the form of elongate fibers of small diameter. In the preferred practice of our invention, where it is necessary or desirable that the residue be adjusted in composition to produce, when treated in accordance with the above outlined process, a mass of minute fibers or wool, the amount of aluminate-forming materials and titanium oxide-bearing materials which should be added to a residue of any particular composition to produce the desired results may be readily calculated, in accordance with the principles above given.

Having thus described our invention, what we claim is:

1. As a new material, bauxite residue in the form of minute wool-like fibers.

2. As a new material, bauxite residue in the form of minute wool-like fibers of soft, cotton-like texture, said bauxite residue having a content of titanium oxide between about 5 per cent and about 15 per cent.

3. The method of making masses of minute wool-like fibers from residues of the class described comprising adding to said residues an aluminate-forming material in amount necessary to produce a final mixture containing an amount of aluminate-forming material substantially equal to or greater than the amount required to convert the alumina contained in said mixture into aluminate, melting the mixture and passing it in molten form through a stream of gaseous fluid delivered at high pressure.

4. The method of making masses of minute wool-like fibers from residues of the class described, comprising adding to said residues an aluminate-forming material in amount necessary to produce a final mixture containing an amount of aluminate-forming materials at least substantially equal to the amount required to convert the alumina contained in said mixture into aluminate, adjusting the titanium oxide content of the mixture to between 5 per cent and 15 per cent, melting the mixture, and passing it in molten form through a stream of gaseous fluid delivered at high pressure.

5. As a new material, bauxite residue in the form of minute wool-like fibers, said residue having an alumina content of 19.5 to 33 per cent and a content of aluminate-forming materials sufficient to convert all of the alumina present to aluminate.

6. As a new material, bauxite residue in the form of minute wool-like fibers, said residue having an alumina content of 19.5 to 33 per cent and a content of aluminate-forming materials sufficient to convert all of the alumina present to aluminate and having a silica content of from 11.4 to 13 per cent.

JOHN E. MORROW.
JESSE BRYTE BARNITT.